United States Patent [19]

Sakoe

[11] 4,282,403
[45] Aug. 4, 1981

[54] PATTERN RECOGNITION WITH A WARPING FUNCTION DECIDED FOR EACH REFERENCE PATTERN BY THE USE OF FEATURE VECTOR COMPONENTS OF A FEW CHANNELS

[75] Inventor: Hiroaki Sakoe, Tokyo, Japan

[73] Assignee: Nippon Electric Co., Ltd., Tokyo, Japan

[21] Appl. No.: 64,965

[22] Filed: Aug. 8, 1979

[30] Foreign Application Priority Data

Aug. 10, 1978 [JP] Japan .................................. 53-98069

[51] Int. Cl.$^3$ ............................................... G10L 1/00
[52] U.S. Cl. ........................... 179/1 SD; 340/146.3 H
[58] Field of Search ......................... 179/1 SM, 1 SB; 364/728; 340/146.3 H, 146.3 AQ

[56] References Cited

U.S. PATENT DOCUMENTS

| 3,700,815 | 10/1972 | Doddington et al. | 179/1 SB |
| 3,755,627 | 8/1973 | Berkowitz et al. | 179/1 SD |
| 3,816,722 | 6/1974 | Sakoe et al. | 364/728 |
| 4,069,393 | 1/1978 | Martin et al. | 179/1 SD |

OTHER PUBLICATIONS

L. Pols, "Real Time Recognition etc.", IEEE Trans. on Computers, Sep. 1971, pp. 972-978.
Sakoe et al., "Dynamic Programming for Spoken Word Recognition", IEEE Trans. Acoustics, Speech, SP, Feb. 1978, pp. 43-49.

*Primary Examiner*—Mark E. Nusbaum
*Assistant Examiner*—E. S. Kemeny
*Attorney, Agent, or Firm*—Sughrue, Rothwell, Mion, Zinn and Macpeak

[57] ABSTRACT

In a pattern recognition device according to pattern matching, one or more specific dimensions of vector components are memorized for each reference pattern feature vector sequence in a reference pattern memory for the reference pattern feature vector sequences. A warping function for time-normalizing input pattern feature vectors of a sequence and the vectors of each reference pattern feature vector sequence is determined so as to minimize the difference between a pattern represented by the specific vector components of the specific dimension or dimensions and another pattern represented by the vector components corresponding in the input pattern feature vector sequence to the specific reference pattern feature vector components as regards the dimensions of a space in which each input or reference pattern feature vector is defined. The input pattern feature vector sequence and each reference pattern feature vector sequence are subjected to nonlinear pattern matching with reference to the warping function. The pattern matching may be between the vector components of all dimensions or those of several dimensions including the specific dimension or dimensions. Preferably, one or more dimensions are specified as the specific one or ones by selecting each dimension for which a variation with time of a pattern represented by the reference pattern feature vector components is a maximum of similar variations of patterns represented by the vector components of other dimensions.

4 Claims, 11 Drawing Figures

PATTERN RECOGNITION WITH A WARPING FUNCTION DECIDED FOR EACH REFERENCE PATTERN BY THE USE OF FEATURE VECTOR COMPONENTS OF A FEW CHANNELS

BACKGROUND OF THE INVENTION

This invention relates to a device for recognizing an input pattern with reference to a predetermined number of reference patterns. Although equally well applicable to recognition of various patterns, such as type-printed or hand-printed letters, a device according to this invention will be described in the following mainly in connection with a speech recognition device.

A device for recognizing continuous speech sounds of one or more actually spoken words and for encoding the result of recognition is advantageous as a device for supplying data and/or program words to an electric digital computer and a device for supplying control data to various apparatus. The reasons are as follows. First, the input operation may be carried out by any untrained person because it is only necessary to pronounce the input data rather than manipulating a keyboard or a like facility. Secondly, the input operation is possible with hands and feet used in accomplishing other purposes. In the third place, the input data may be supplied to the computer or the like even from a remote location merely through an ordinary telephone network. Because of these merits, the speech recognition devices are widely in demand and have been developed at various places in the world into practical use.

In a speech recognition device, it is preferred in general to carry out pattern matching with the technique of dynamic programming resorted to as described in, for example, U.S. Pat. No. 3,816,722 issued to Hiroaki Sakoe and Seibi Chiba, assignors to the present assignee. In a speech recognition device of this type, speech sound is subjected to spectrum analysis, sampling, and digitization to be transformed into a time sequence of vectors representative of features of the speech sound at the respective sampling instants (hereafter referred to as a time sequence of feature vectors). The speech sound is representative of one or more continuously spoken words of a preselected vocabulary. The time sequence is representative of a speech sound pattern of the continuously spoken word or words. Prior to recognition of each speech sound pattern supplied to the device (hereafter named an input pattern), which is unknown to the device, at least one standard speech sound pattern for each word of the vocabulary (hereafter called at least one reference pattern) is supplied to the device and memorized therein. Comparison, namely, pattern matching, is carried out between the input pattern and every reference pattern with the dynamic programming technique resorted to. One of the reference patterns that is most similar to the input pattern is selected. The word represented by the selected reference pattern gives the result of recognition.

It is to be noted here that the input pattern is subject to a complicated and nonlinear deformation as regards the time axis as a result of variations in the speed of utterance as pointed out in the above-cited patent and also in an article contributed by Hiroaki Sakoe and Seibi Chiba to IEEE Transactions on Acoustics, Speech, and Signal Processing, Vol. ASSP-26, No. 1 (February 1978), pages 43–49, under the title of "Dynamic Programming Algorithm Optimization for Spoken Word Recognition." Optimum pattern matching is achieved only after nonlinearly compensating for fluctuations or shifts between the time axes of the input pattern and the respective reference patterns. As will be discussed more in detail in the following, a considerable amount of calculation is necessary even with application thereto of the dynamic programming technique. High-priced calculators are indispensable in accomplishing the calculation within a reasonable interval of time.

Accurate or reliable speech recognition devices are therefore expensive. Low-priced ones are objectionable as to their performance. Conventional speech recognition devices are thus still defective with respect to the performance-to-price ratio.

SUMMARY OF THE INVENTION

It is therefore an object of the present invention to provide a pattern recognition device that is excellent in the ratio of performance to price.

It is a more specific object of this invention to provide a pattern recognition device of the type described, which is not expensive but retains the capability of carrying out pattern matching and time normalization.

According to this invention, there is provided a pattern recognition device for recognizing an input pattern with reference to a plurality of reference patterns, which comprises input pattern buffer means for memorizing a time sequence of input pattern feature vectors representative of the input pattern and defined by vector components in a space of a prescribed number of dimensions and reference pattern memory means for memorizing time sequences of reference pattern feature vectors representative of the respective reference patterns and given by vector components in the space. The vector components of any one of the reference pattern feature vector sequences and the input pattern feature vector components thereby correspond to one another as regards the dimensions. The reference pattern memory is for further memorizing dimension specifying signals in one-to-one correspondence with the reference pattern feature vector sequences, each dimension specifying signal specifying specific vector components of the reference pattern feature vector sequence corresponding to the said each dimension specifying signal. The specific vector components are the components of that at least one specific dimension among the dimensions of the space which is specific to the reference pattern feature vector sequence corresponding to the above-mentioned each dimension specifying signal. The device further comprises time-normalizing means connected to the input pattern buffer means and the reference pattern memory means for carrying out time normalization between the input pattern feature vector sequence and each reference pattern feature vector sequence by determining a warping function for the said each reference pattern feature vector sequence for correlating the input pattern feature vectors and the feature vectors of the said each reference pattern feature vector sequence as regards time so as to minimize a difference between a pattern represented by the specific vector components specified by the dimension specifying signal corresponding to the above-mentioned each reference pattern feature vector sequence and another pattern represented by the input pattern feature vector components corresponding to the last-mentioned specific vector components and comparing means connected to the input pattern buffer means, the reference pattern memory means, and the time-normalizing means for comparing the input pattern feature vector sequence and the reference pattern feature vector sequences with one another with reference to the warping functions determined for the respective reference pattern feature vector sequences to decide the input pattern to be one of the reference patterns, the reference pattern feature vector sequence representative of which is most similar to the input pattern feature vector sequence among the reference pattern feature vector sequences.

DESCRIPTION OF THE PREFERRED EMBODIMENTS

Figure 1:
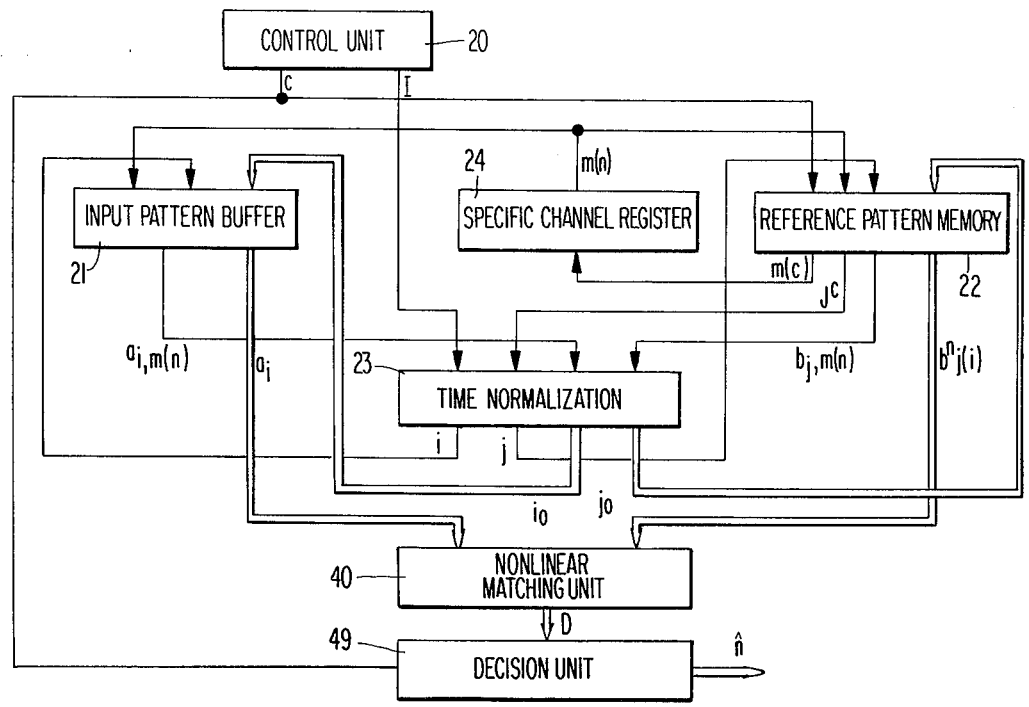
FIG. 1 is a block diagram of a pattern recognition device according to a first embodiment of the instant invention.

The technique of pattern matching described in the above-referenced article will briefly be reviewed at first in order to facilitate an understanding of the present invention. Merely for simplicity of description, an input pattern A to be recognized will be restricted to that representative of a certain spoken word. For recognition of each of various input patterns A's representative of individually spoken words of a vocabulary consisting of a predetermined number of words, first to K-th reference patterns $B^c$ (c = 1, 2, ..., n, ..., N) are provided for the words of the vocabulary. Each word of the vocabulary may be pronounced or uttered in more than one manner of pronunciation. It will nevertheless be presumed throughout the description that the reference patterns $B^c$ represent a plurality of reference words, respectively. This is merely for simplifying the notations, namely, for designating the reference words as first to K-th reference words simply by word-identifying numbers c that are used also in specifying the respective reference patterns $B^c$.

An input pattern A is represented by a time sequence of first to I-th input pattern feature vectors $a_i$ (i = 1, 2, ..., I) arranged along a time axis i at equally spaced i-th time points as:

$$A = a_1, a_2, \ldots, a_I,$$

where the number I of feature vectors in the sequence, namely, the length of the sequence, will be called an input pattern length or duration. Likewise, the respective reference patterns $B^c$ are given by time sequences, each consisting of first to $J^n$-th reference pattern feature vectors $b^n_j$ (j = 1, 2, ..., $J^n$), as:

$$B^c = b^c_1, b^c_2, \ldots, b^c_{J_c},$$

where $J^c$ (written as Jc in a simplified manner in the above-given equations for c = 1, 2, ..., n, ..., N) will be named reference pattern durations. The vectors $a_i$ and $b^c_j$ will be denoted simply by $a_i$ and $b^c_j$ in the following. The reference pattern feature vectors $b^c_j$ are equally spaced at j-th instants along a time axis j that may be deemed to be common to the reference patterns $B^c$. The equal spacing between the input pattern feature vectors $a_i$ and between the reference pattern feature vectors $b^c_j$ are decided by a common sampling interval.

The feature vectors $a_i$ and $b^c_j$ are defined by first to K-th vector components in a K-dimensional space. The vector components are obtained by analysing each pattern A or $B^n$ into a plurality of channels, K in number, of different frequencies, such as logarithmically equally spaced frequencies, as:

$$a_i = (a_{i,1}, a_{i,2}, \ldots, a_{i,k}, \ldots, a_{i,K})$$

and $$b^c_j = (b^c_{j,1}, b^c_{j,2}, \ldots, b^c_{j,k}, \ldots, b^c_{j,K}),$$

where $a_{i,k}$ or $a_{ik}$ and $b^c_{j,k}$ or $b^c_{jk}$ (k representing one of 1, 2, ..., and K) represent the k-th vector components. The input pattern feature vector components and the vector components of any one of the reference patterns $B^n$, such as $a_{ik}$ and $b^n_{jk}$, thus correspond to one another as regards the dimensions of the space. The number K of the dimensions or channels is usually selected to be an integer between about ten and fifteen.

As discussed also in various other references, such as the above-cited U.S. Pat. No. 3,816,722, the i axis is subjected to nonlinear shift or fluctuation relative to the j axis. A monotonically increasing function j of an independent variable i, namely, $$j = j(i)$$

for use in transforming the i axis onto the j axis, is used in eliminating the fluctuation. Normalization of the axes i and j as regards time is carried out by the function j(i), which will be referred to as a warping function because the j axis for each reference pattern $B^n$ is warped according thereto so that optimum correspondence is attained between the instants i and j along the respective axes, namely, so that the input pattern feature vectors $a_i$ and the reference pattern feature vectors $b^c_j$ are correlated to one another as regards time. It is possible to understand that the axes i and j define an i-j plane. Points (i, j) on the i-j plane will be called lattice points. Inasmuch as a difference between an input pattern A and a reference pattern B is rendered minimum when the fluctuation is optimally compensated for, the warping function j(i) is determined so that:

$$D(A, B) = \min_{j=j(i)} \sum_{i=1}^{I} d(i, j), \quad (1)$$

where d(i, j) represents $|a_i-b_j|$, namely, distances between various combinations of the input pattern and the reference pattern feature vectors $a_i$ and $b_j$. The minimum of the time-normalized value D(A, B) of the distances as a whole will be named a time-normalized distance. The time-normalized distance D(A, B) is rendered substantially equal to zero when the reference pattern B corresponds to the input pattern A. Otherwise, the time-normalized distances D(A, B)'s or D(A, $B^c$) have finite residual values.

The known technique of dynamic programming may be resorted to for solving the minimization problem given by Equation (1). More particularly, the minimum sought for is found by successively calculating recurrence coefficients g(i, j), as called herein, by the use of a recurrence formula:

$$g(i, j) = d(i, j) + \min_{h=0, 1, 2} g(i-1, j-h), \quad (2)$$

in an ascending order for each of i and j. An increment h for each value of j is limited to 0, 1, and 2 because it is usually sufficient on calculating the time-normalized distance D(A, B) to refer to only three previously calculated recurrence coefficients g(i−1, j), g(i−1, j−1), and g(i−1, j−2), which will be referred to as reference recurrence coefficients. The recurrence formula (2) is calculated, starting at an initial recurrence coefficient g(1, 1) given by an initial condition:

$$g(1, 1) = d(1, 1),$$

to eventually arrive at an ultimate recurrence coefficient g(I, J) that gives the time-normalized distance D(A, B) as:

$$D(A, B) = g(I, J).$$

In practice, it is sufficient that the recurrence formula (2) be calculated only within a normalization or adjustment window as discussed not only in the above-referenced article and patent but also in various other references, such as U.S. Pat. No. 4,059,725 issued to the instant applicant. The window is defined by:

$$j - r \leq i \leq j + r, \quad (3)$$

where r represents a constant called a width or length of the window. Even with the normalization window, a considerable amount of calculation is necessary for determining the time-normalized distance D(A, B). This is because the number of vector components of each of the vectors $a_i$ and $b_j$ is not small. As a result, it is necessary that a conventional device for carrying out the pattern matching technique should comprise high-speed calculators. Conventional pattern recognition devices have accordingly been costly.

As described hereinabove, a device according to this invention carries out at first the time normalization of the time axes i and j of an input pattern A and each reference pattern $B^n$ by selecting a succession of reference pattern feature vector components $b^n_{j,kn}$ or $b_{j,kn}$ of a specific dimension or channel $k^n$ (written as kn again in a simplified fashion for the components $b_{j,kn}$ for $j=1, 2, \ldots, j^n$) from the respective feature vectors $b^n_j$ and also selecting a succession of correspondingly numbered input pattern feature vector components $a_{i,kn}$ from the input pattern feature vectors $a_i$. The specific channel $k^n$ may be differently numbered from one of the reference patterns $B^c$ to another. It is possible to select a plurality of channels, such as two specific channels $k^n_1$ and $k^n_2$. As will become clear as the description proceeds, it is preferred that the feature vector components of the specific channel or channels should vary as much as possible with time. In any event, a warping function j(i) is determined, which is usually nonlinear as regards time. It is thereby possible to decide those of the reference pattern feature vectors $b^n_{j(i)}$ which are time-normalized with respect to the successive input pattern feature vectors $a_i$, namely, optimally related thereto. It is likewise possible to determine those of the input pattern feature vectors $a_{i(j)}$ which are time-normalized relative to the successive feature vectors $b^n_j$ of the reference pattern $B^n$ under consideration. The warping function j(i) thus correlates the input pattern feature vectors $a_i$ and the feature vectors $b^n_j$ of each reference pattern feature vector sequence to one another. The specific channel or channels may be manually specified. Alternatively, it is possible to automatically specify the specific channels for the respective reference patterns $B^c$, at least one for each, as will be described later in conjunction with a device according to an embodiment of this invention.

As described also hereinabove, the device subsequently carries out nonlinear pattern matching between the input pattern A and the reference pattern $B^n$ in question by the use of the whole channels of the successive input pattern feature vectors $a_i$ and the reference pattern feature vectors $b^n_{j(i)}$ that are correlated to the successive input pattern feature vectors $a_i$, respectively, by the warping function j(i). As a result, the device decides a similarity measure, such as the time-normalized distance D(A, B), between the two patterns A and $B^n$.

Let it be assumed that only one specific channel $k^n = m(n)$ is specified for each reference pattern $B^n$. The time normalization between the input pattern A and the reference pattern $B^n$ under consideration may be carried out by calculating a specific time-normalized distance $D'(A, B^n)$ defined by:

$$D'(A, B^n) = \min_{j=j(i)} \sum_{i=1}^{I} d(i, j, m(n)), \quad (4)$$

instead of Equation (1). In Equation (4), $$d(i, j, m(n)) = |a_{i,m(n)} - b_{j,m(n)}|, \quad (5)$$

namely, specific elementary distances between various combinations of specific feature vector components $a_{i,m(n)}$ and $b_{j,m(n)}$. It should be noted that the vector components are restricted to those of the specific channels, namely, the $k^n$-th or m(n)-th channel. A warping function j(i) is determined by Equation (4) so that a total sum of the specific elementary distances is rendered minimum.

On finding a minimum according to Equation (4) by resorting to the dynamic programming technique, specific recurrence coefficients g'(i, j) are successively calculated by the use of a recurrence formula:

$$g'(i, j) = d(i, j, m(n)) + \min_{h=0, 1, 2} g(i - 1, j - h), \qquad (6)$$

starting at an initial condition:

$$g'(1, 1) = d(1, 1, m(n)),$$

within the normalization window defined by Equation (3), the boundaries inclusive. The value of the specific time-normalized distance $D'(A, B^n)$, however, is unnecessary according to this invention. What is necessary is the warping function $j(i)$. It is therefore necessary to calculate an optimum increment function $H(i, j)$ according to $$H(i, j) = \arg \min_{h=0, 1, 2} g(i - 1, j - h), \qquad (7)$$

in order to successively determine optimum increments h's for each of which a minimum of reference recurrence coefficients $g(i-1, j-h)$ is found. When Equation (5) is eventually calculated to an ultimate recurrence coefficient $g'(I, J)$, the warping function $j(i)$ is decided by another recurrence formula:

$$j(i-1) = j(i) - H(i, j(i)), \qquad (8)$$

starting at an initial condition:

$$j(I) = J,$$

in a descending order, for $i = I-1, I-2, \ldots, 2$. Incidentally, $$j(1) = 1.$$

Once a warping function $j(i)$ is determined for each reference pattern $B^n$, it is now readily possible to compare the input pattern A with that reference pattern $B^n$. The pattern matching is carried out nonlinearly according to:

$$D''(A, B^n) = \sum_{i=1}^{I} |a_i - b^n_{j(i)}| \qquad (9)$$

between various combinations of the successive input pattern feature vectors $a_i$ and those specific reference pattern feature vectors $b^n_{j(i)}$ which are related according to the warping function $j(i)$ to the successive input pattern feature vectors $a_i$. Some of the reference pattern feature vectors $b^n_j$ may not be included in the specific feature vectors $b^n_{j(i)}$. On the other hand, some may be repeatedly included in the latter.

Referring now to FIG. 1, a pattern recognition device according to a first embodiment of this invention is for recognizing an input pattern A with reference to a plurality of reference patterns $B^c$. When the device is for recognition of speech sound, each reference word of a vocabulary is represented by at least one of the reference patterns $B^c$ as pointed out hereinabove. The device comprises a common control unit 20 for producing various control signals as will become clear as the description proceeds. An input pattern buffer 21 is for memorizing a time sequence of input pattern feature vectors $a_i$ that is representative of the input pattern A and is defined by vector components $a_{i,1}, a_{i,2}, \ldots, a_{i,k}, \ldots$, and $a_{i,K}$ in a space of a prescribed number of dimensions, now, a K-dimensional space. A reference pattern memory 22 is for memorizing time sequences of reference pattern feature vectors $b^c_j$ that are representative of the respective reference patterns $B^c$ and are given by vector components $b^c_{j,1}, b^c_{j,2}, \ldots, b^c_{j,k}, \ldots$, and $b^c_{j,K}$ again in the K-dimensional space. The memory 22 is for further memorizing reference pattern durations $J^c$ and dimension or channel specifying signals $m(c)$ in one-to-one correspondence with the reference pattern feature vector sequences. Each dimension specifying signal $m(n)$ specifies specific vector components $b^n_{j,m(n)}$ or $b_{j,m(n)}$ of a specific dimension or channel $k^n = m(n)$ in one of the reference pattern feature vector sequences that corresponds to that dimension specifying signal $m(n)$. As soon as the input pattern A is memorized in the buffer 21, the control unit 20 supplies a time-normalization unit 23 with a signal representative of an input pattern duration I. The control unit 20 futhermore delivers reference pattern specifying signals c to the memory 22 to make the same cyclically produce the dimension specifying signals $m(c)$ and supply the normalization unit 23 with signals representative of the reference pattern durations $J^c$. During the time that the reference pattern specifying signals c specify a certain reference pattern $B^n$, a specific channel register 24 retains the dimension specifying signal $m(n)$ for that reference pattern $B^n$ and delivers that signal $m(n)$ to the buffer 21 and the memory 22. Throughout the following description, signals and the quantity they represent will often be designated by like reference symbols.

Figure 2:
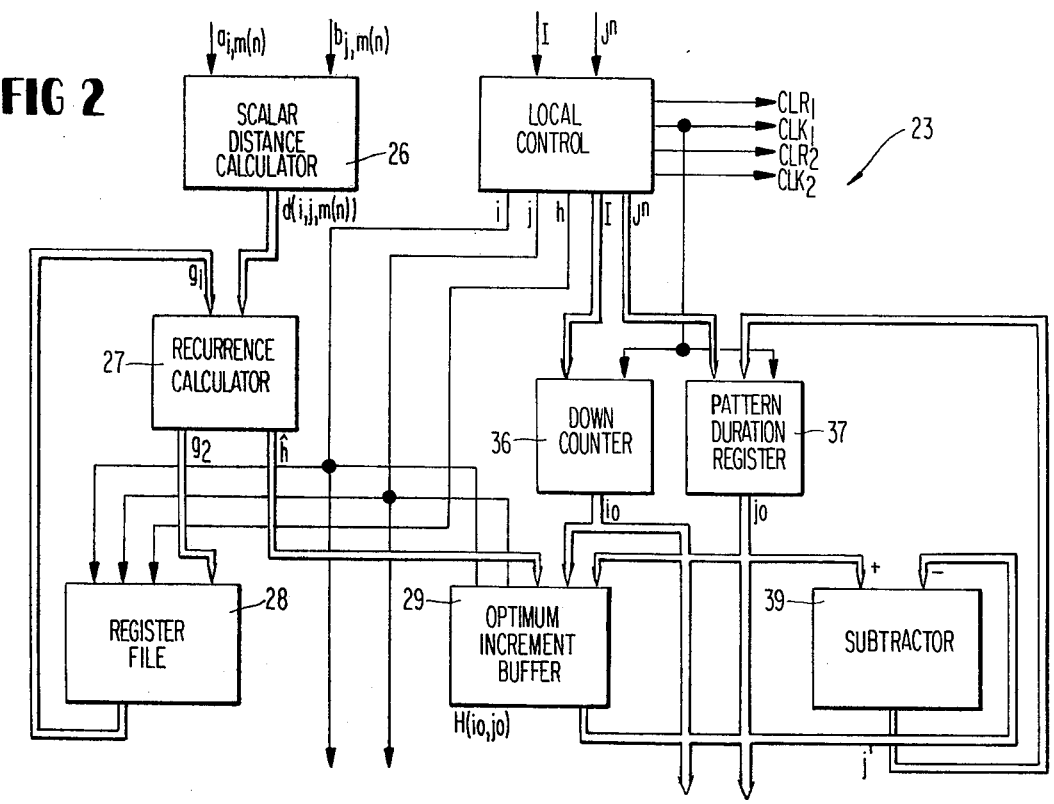
FIG. 2 is a block diagram of a time-normalization unit for use in a pattern recognition device shown in FIG. 1.

Turning temporarily to FIG. 2, the time-normalization unit 23 is for carrying out time normalization between the input pattern A and the reference pattern $B^n$ being specified with a warping function $j(i)$ determined for each reference pattern $B^n$ that correlates the input pattern feature vectors $a_i$ and the feature vectors $b^n_j$ of that reference pattern $B^n$ to one another as regards time so as to minimize a difference between a pattern represented by specific reference pattern feature vector components $b_{j,m(n)}$ specified by the dimension specifying signal $m(n)$ for that reference pattern $B^n$ and another pattern represented by specific input pattern feature vector components $a_{i,m(n)}$ corresponding to the specific reference pattern feature vector components $b_{j,m(n)}$ as regards the dimensions of the space. The unit 23 comprises a local control unit 25 responsive to the input pattern duration signal I and the reference pattern duration signal $J^n$ for the reference pattern $B^n$ under consideration for delivering first and second timing signals i and j to the input pattern buffer 21 and the reference pattern memory 22, respectively, with discrete values of the first timing signal i varied from 1 to I within the normalization window defined by Equation (3) for each of discrete values 1 to $J^n$ of the second timing signal j. Supplied with the specific input and reference pattern feature vector components $a_{i,m(n)}$ and $b_{j,m(n)}$ specified by the dimension specifying signal $m(n)$ and the first timing signal i and by the reference pattern specifying signal n being produced, the dimension specifying signal $m(n)$, and the second timing signal j, a scalar distance calculator 26 successively calculates specific elementary distances $d(i, j, m(n))$ according to Equation (3) and supplies the elementary distances to a recurrence calculator 27. The timing signals i and j are supplied also to a register file 28 and an optimum increment buffer 29 as address signals. The register file 28 is supplied from the control unit 25 with an increment signal h for repeatedly specifying increments 2, 1, and 0 while the timing signals i and j specify each of the lattice points (i, j).

Figure 3:
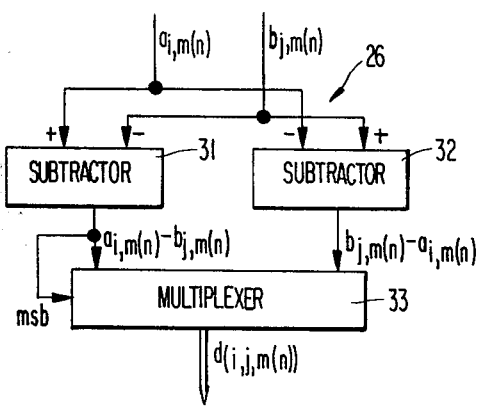
FIG. 3 is a block diagram of a distance calculator for use in the time-normalizing unit depicted in FIG. 2.

Further turning to FIG. 3, the scalar distance calculator 26 comprises first and second substractors 31 and 32 for calculating first and second elementary distances $a_{i,m(n)} - b_{j,m(n)}$ and $b_{j,m(n)} - a_{i,m(n)}$ to produce a first and a second difference signal representative of the respective elementary distances. Responsive to the sign bit msb of the first difference signal, a multiplexer 33 selects the first and the second difference signals according to whether the first elementary distance is positive or negative, respectively. The multiplexer 33 produces the elementary distances calculated according to Equation (5)

Turning back to FIG. 2, the initial condition for the recurrence formula (6) is set at first in the register file 28 in a known manner. When each of the lattice points (i, j) is specified by the first and the second timing signals i and j, the register file 28 supplies the recurrence calculator 27 with a first recurrence signal $g_1$ successively representative of the reference recurrence coefficients $g(i-1, j-h)$ memorized in the addresses specified by the first timing signal i and the second timing signal j varied by the increment signal h. The calculator 27 calculates a new value of the specific recurrence coefficients $g'(i, j)$ according to Equation (6) and supplies the new value back to the register file 28 as a second recurrence signal $g_2$, which is stored in the address specified by the timing signals i and j. According to Equation (7), the calculator 27 decides the optimum increment h, which is stored in that address of the optimum increment buffer 21 which is specified by the timing signals i and j. As will readily be understood, the calculation proceeds without regard to the input pattern duration I. It is therefore possible to make the local control unit 25 produce the timing signals i and j in response to sampling pulses for the input pattern feature vectors $a_i$.

Figure 4:
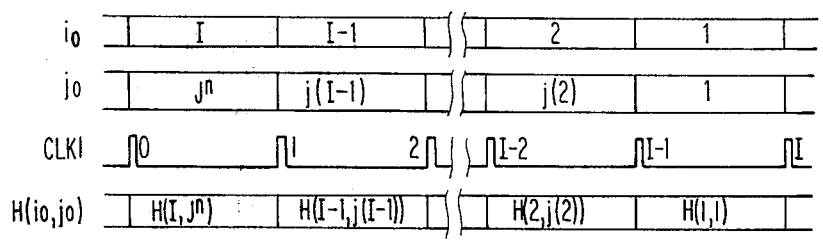
FIG. 4 is a time chart for describing the operation of the time-normalizing unit illustrated in FIG. 2.

Referring further to FIG. 2 and afresh to FIG. 4, the local control unit 25 produces local signals representative of the input and the reference pattern durations I and $J^n$ and a first clear pulse $CLR_1$ immediately after the longer of the input and the reference pattern durations I and $J^n$ is indicated by a pertinent one of the first and the second timing signals i and j. The clear pulse $CLR_1$ is followed by a zeroth to an I-th pulse of a first clock pulse sequence $CLK_1$. In response to the zeroth clock pulse, the pattern durations I and $J^n$ are set in a down counter 36 and a reference pattern duration register 37, respectively. The counter 36 and the register 37 produces first and second incremental signals $i_0$ and $j_0$ representative at first of the pattern durations I and $J^n$ to give the initial condition for the recurrence formula (8). The incremental signals $i_0$ and $j_0$ are supplied to the optimum increment buffer 29, which produces an increment function signal $H(i_0, j_0)$ representative of the optimum increment h memorized in the address $(I, j^n)$. A subtractor 39 subtracts the optimum increment h for the lattice point $(I, J^n)$ from the second incremental signal $j_0$ to produce a local incremental signal $j'$ representative of $j(I-1)$, which gives the value of the warping function $j(i)$ used in the recurrence formula (8). Responsive to a first one of the clock pulses $CLK_1$, the down counter 36 is counted down by one and the local incremental signal $j'$ is registered in the register 37. The incremental signals $i_0$ and $j_0$ now represent $I-1$ and $j(I-1)$. In this manner, the incremental signals $i_0$ and $j_0$ successively represent lattice points (i, j) along the warping function $j(i)$.

Referring back to FIG. 1, the device now compares the input pattern A and the reference pattern $B^c$ with one another with reference to the warping functions $j(i)$'s determined for the respective reference patterns $B^c$ and decides the input pattern A to be one of the reference patterns $B^c$ that is most similar among the reference patterns $B^c$ to the input pattern A. In the example being illustrated, the first and the second incremental signals $i_0$ and $j_0$ are used to read the input pattern buffer 21 and the reference pattern memory 22. The buffer 21 produces successive feature vectors $a_i$ of the input pattern A from the I-th vector $a_I$ to the first vector $a_1$. The memory 22 produces optimally related feature vectors $b^n_{j(i)}$ of the reference pattern $B^n$ being specified by the reference pattern specifying signal n from the $J^n$-th vector $b^n_{J^n}$ to the first vector $b^n_1$. Responsive to the read-out feature vectors $a_i$ and $b^n_{j(i)}$, a nonlinear matching unit 40 carries out nonlinear pattern matching between a pattern represented by the read-out input pattern feature vectors $a_i$, now, the input pattern A, and another pattern represented by the read-out reference pattern feature vectors $b^n_{j(i)}$, now, a time-normalized reference pattern $B^{n'}$, to derive for the reference pattern $B^n$ in question a similarity measure between the input pattern A and the time-normalized reference pattern $B^{n'}$. The similarity measure may be the specific time-normalized distance $D''(A, B^n)$ described with reference to Equation (9). The matching unit 40 produces a similarity measure signal D representative of the calculated similarity measure.

Figure 5:
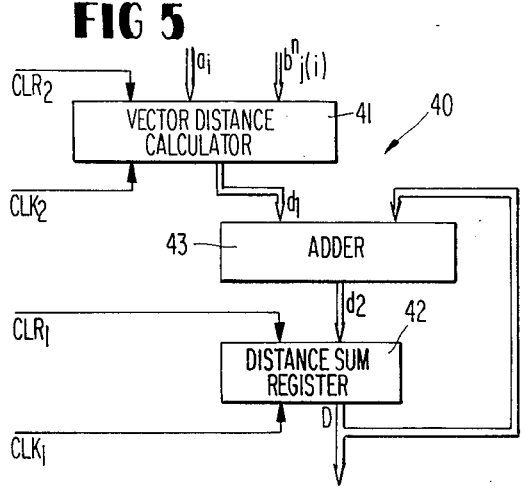
FIG. 5 is a block diagram of a nonlinear matching unit for use in the pattern recognition device shown in FIG. 1.
Figure 6:
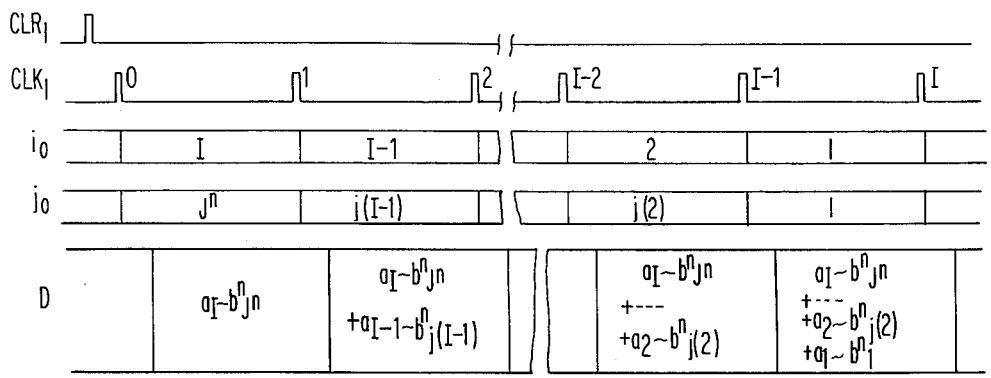
FIG. 6 is a time chart for describing the operation of the nonlinear matching unit illustrated in FIG. 5.

Referring to FIGS. 5 and 6, a nonlinear matching unit 40 for the specific time-normalized distance $D''(A, B^n)$ comprises a vector distance calculator 41 for calculating a vector distance or difference between each of the successive input pattern feature vectors $a_i$ and the optimally related one of the reference pattern feature vectors $b^n_{j(i)}$ to produce an instantaneous vector distance signal $d_1$ representative of the vector distance. A distance sum register 42 is cleared by the first clear pulse $CLR_1$ and supplies a variable signal D representative of that current content thereof which eventually represents the specific time-normalized distance $D''(A, B^n)$ as will presently be described. An adder 43 calculates a sum of the instantaneous distance signal $d_1$ and the variable signal D to supply the register 42 with a distance sum signal $d_2$ representative of the sum, which is registered in the register 42 in response to each pulse of the first clock pulse sequence $CLK_1$. The register 42 and the adder 43 thus serve as an integrator for the distance signal $d_1$. The sum signal $d_2$ registered in the register 42 in response to the I-th pulse of the clock pulse sequence $CLK_1$ represents the specific distance $D''(A, B^n)$ calculated according to Equation (9). The local control unit 25 (FIG. 2) supplies the distance calculator 41 with a second clear pulse $CLR_2$ and a zeroth to a K-th pulse of a second clock pulse sequence $CLK_2$ for each pulse of the first clock pulse sequence $CLK_1$ for the purpose that will be described in the following.

Figure 7:
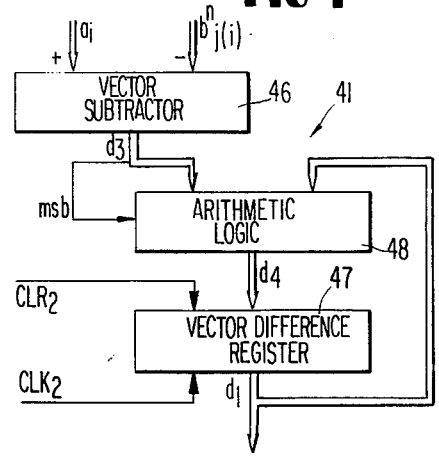
FIG. 7 is a block diagram of a vector distance calculator for use in a distance calculator shown in FIG. 5.
Figure 8:
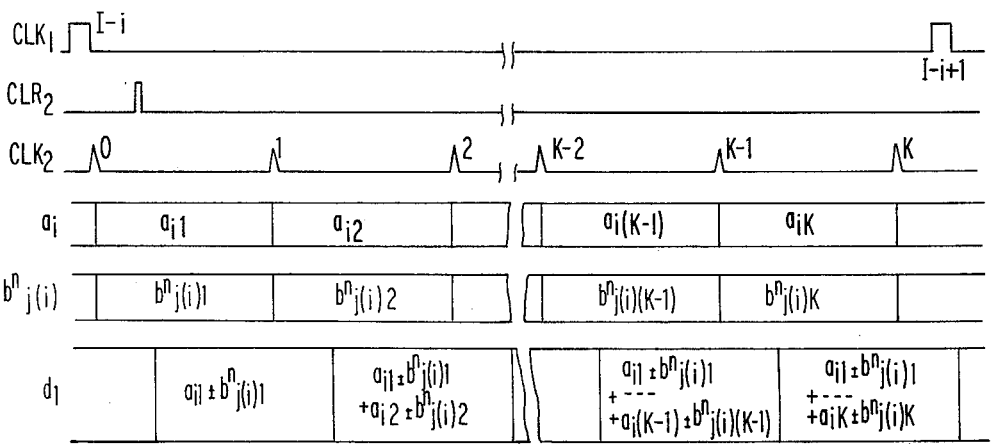
FIG. 8 is a time chart for describing the operation of the vector distance calculator depicted in FIG. 7.

Referring to FIGS. 7 and 8, the vector distance calculator 41 comprises a vector subtractor 46 for successively calculating vector differences $a_i - b^n_{j(i)}$ by subtracting, from each of the successive input pattern feature vector components $a_{i,k}$, a related one of the reference pattern feature vector components $b^n_{j(i),k}$ to produce a vector distance signal $d_3$ representative of the vector difference. An instantaneous vector difference register 47 is cleared by the second clear pulse $CLR_2$ and produces a variable vector signal $d_1$ representative of that current content thereof which eventually represents the instantaneous vector distance $d_1$ as will shortly become clear. Controlled by the sign bit msb of the vector distance signal $d_3$, an arithmetic logic unit 48 calculates a sum of the signals $d_1$ and $d_3$ and a difference $d_1$ less $d_3$ according as the current one of the differences $a_i - b^n_{j(i)}$ is positive and negative, respectively, to produce a resulting vector distance signal $d_4$, which is registered in the register 47 in response to each of the first through the K-th pulses of the second clock pulse sequence $CLK_2$. The content of the register 47 represents the instantaneous vector distance $d_1$ when the K-th one of the second clock pulses $CLK_2$ is produced.

Referring to FIG. 3 once more, similarity measures, such as specific time-normalized distances $D''(A, B^n)$, are calculated for the respective reference patterns $B^c$ successively specified by the reference pattern specifying signals c. A determination or decision unit 49, similar in structure and operation to that described in the above-referenced U.S. Pat. No. 3,816,722 with reference to FIG. 11 thereof, finds a maximum of the similarity measures or a minimum of the distances $D''(A, B^c)$ and decides one of the reference pattern specifying signals c in response to which the maximum or the minimum is calculated by the nonlinear matching unit 40. The decision unit 49 produces either the optimum reference pattern specifying signal $\hat{n}$ or the reference pattern $B^{\hat{n}}$ specified thereby as an output signal $\hat{n}$. When the device is for recognizing speech sound, the output signal $\hat{n}$ may represent one of the reference words c that is represented by the optimum reference pattern $B^{\hat{n}}$.

Figure 9A:
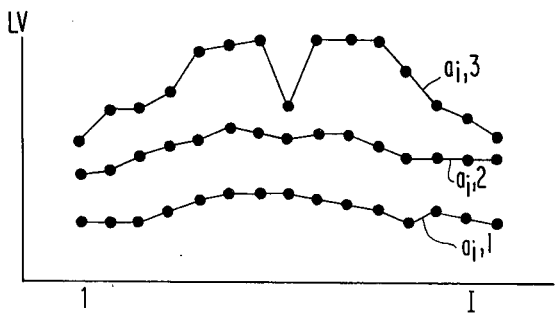
FIG. 9(a) schematically shows an example of an input pattern to be recognized by the pattern recognition device shown in FIG. 1.
Figure 9B:
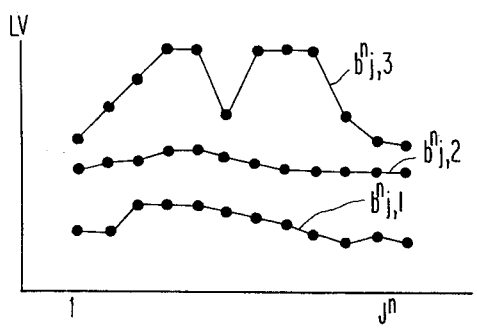
FIG. 9(b) diagrammatically exemplifies one of reference patterns for use as references in the pattern recognition device illustrated in FIG. 1.

Turning to FIG. 9, let it be surmised that levels LV of the first-channel through the third-channel vector components $a_{i,1}$ to $a_{i,3}$ of input pattern feature vectors $a_i$ of a sequence vary as exemplified in FIG. 9 (a) and those LV of the corresponding components $b^{n\ hd\ j,1}$ to $b^n_{j,3}$ of reference pattern feature vectors $b^n_j$ of a reference pattern $B^n$, as in FIG. 9 (b). It is clear that the warping function j(i) for that reference pattern $B^n$ is rendered strong against any superfluous noise when the third channel is specified as the specific channel $k^n$ or m(n) for the reference pattern $B^n$ under consideration.

Finally referring to FIG. 10, a portion of a pattern recognition device for recognizing speech sound according to a second embodiment of this invention comprises a control unit 20, an input pattern buffer 21, and a reference pattern memory 22 of the type described hereinabove. Besides for storing an input pattern A in the buffer 21, the illustrated portion is for storing reference patterns $B^c$ in the memory 22 in response to individually spoken reference words c of a vocabulary and for automatically and effectively specifying a preselected number of specific dimension or dimensions $k^n$ for each reference pattern $B^n$. The illustrated portion comprises an input unit 51 for frequency-analysing, sampling, and then digitizing each piece of speech sound u into a sequence of feature vectors v. The input unit 51 may be of the structure and operation of that described in the above-cited U.S. Pat. No. 3,816,722 with reference to FIG. 11 thereof or a spectrum analyser that is referred to by Louis C. W. Pols in an article he contributed to IEEE Transactions on Computers, Vol. C-20, No. 9 (September issue, 1971), pages 972-978, under the title of "Real-Time Recognition of Spoken Words," in FIG. 1, at band filters, log, detection, multiplexer, and ADC. A switch 52 symbolically depected as a mechanical switch is controlled by a control signal CTL produced by the control unit 20 so as to send the feature vector sequence v to the buffer 21 as an input pattern feature vector sequence $a_i$ when the speech sound u is for an input word to be recognized by the device.

Figure 10:
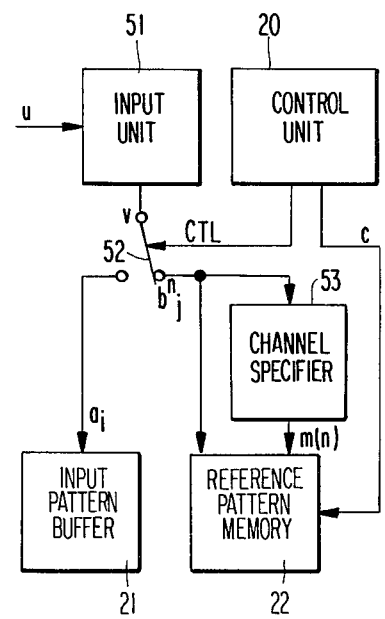
FIG. 10 is a partial block diagram of a pattern recognition device according to a second embodiment of this invention.

In FIG. 10, the switch 52 sends the feature vector sequence v to the reference pattern memory 22 and to a dimension or channel specifier 53 as a reference pattern feature vector sequence $b^n_j$ when the speech sound u is for a reference word n of the vocabulary. The specifier 53 detects a variation in time of the feature vector components $b^n_{j,k}$ of each dimension or channel k, compares the variations for the respective channels 1, 2, ..., k, ..., and k with one another, and selects the specific channel or channels $k^n$ for which the variation or variations are maximum as a whole. More particularly, the specifier 53 calculates a whole variation F(k) according to:

$$F(k) = \sum_{j=1}^{J^m} |b^n_{j,k} - b^n_{j-1,k}| \qquad (10)$$

for each of the channels 1 to K. The specifier 53 produces a dimension specifying signal m(n) representative of the specific channel or channels for which the whole variation or variations F(k) or F(k)'s are maximum. The feature vector sequence $b^n_j$ and the dimension specifying signal m(n) are stored as the reference pattern $B^n$ and the above-described channel specifying signal $m^n$ in that address of the memory 22 which is specified by the reference pattern specifying signal c made by the control unit 20 to specify the reference pattern $B^n$ under consideration.

While this invention has thus far been described in specific conjunction with a few preferred embodiments thereof, it is now clear to those skilled in the art to put this invention into effect in various other manners. For example, it is possible to further reduce the amount of calculation and to minimize the memory capacity of the reference pattern memory 22 by making the memory 22 memorize only those particular reference pattern feature vector components $b^c_{j,k(c)}$ of the respective reference patterns $B^c$ as the patterns $B^c$ which are of a plurality of particular dimensions k(n) predetermined for each reference pattern $B^n$ so as to include the specific dimension or dimensions $k^n$ therefor. Preferably, the particular dimensions k(c) for the respective reference patterns $B^c$ are selected so that the particular reference pattern feature vector components $b^c_{j,k(c)}$ vary considerably with time. The input pattern buffer 21 is read by the first incremental signal $i_0$ so as to produce those particular input pattern feature vector components $a_{i,k(n)}$ which are of the dimensions corresponding to the particular dimensions k(n) for the currently specified reference pattern $B^n$ as regards the dimensions of the space.

When two or more specific dimensions $k^n$ are specified for a certain reference pattern $B^n$, the specific elementary distance d(i, j, $k^n$) should be calculated according to Equation (5) between various combinations of the specific reference pattern feature vector components $b^n_{j,k}n$ and the corresponding input pattern feature vector components $a_{i,k}n$. The nonlinear matching unit 40 may comprise a comparator (not shown) for comparing the successively produced specific time-normalized distances $D''(A, B^c)$ with a threshold level to make the decision unit 49 compare only those of the distances $D''(A, B^c)$ which are nearly equal to zero. The increment h may be specified in various other ways. Each of the decision unit 49 and the channel specifier 53 may be a microprocessor described on page 7 of "The Am2900 Family Data Book" published 1976 by Advanced Micro Devices, Inc., California, U.S.A. Instead of Equation (10), it is possible to use other equations, such as:

$$F(k) = \max_i a_{i,k} - \min_i a_{i,k}.$$

What is claimed is:

1. A pattern recognition device for recognizing an input pattern with reference to a plurality of reference patterns, said device comprising:

input pattern buffer means for memorizing a time sequence of input pattern feature vectors representative of said input pattern and defined by vector components in a space of a prescribed number of dimensions;

reference pattern memory means for memorizing time sequences of reference pattern feature vectors representative of the respective reference patterns and given by vector components in said space, the vector components of any one of said reference pattern feature vector sequences and said input pattern feature vector components of an associated one of said input pattern feature vectors thereby corresponding to one another, said reference pattern memory means being for further memorizing dimension specifying signals in one-to-one correspondence with said reference pattern feature vector sequence, each dimension specifying signal specifying specific vector components within a specific dimension of the reference pattern feature vector sequence;

time-normalizing means connected to said input pattern buffer means and said reference pattern memory means for carrying out time normalization between said input pattern feature vector sequence and each reference pattern feature vector sequence by determining a warping function for said each reference pattern feature vector sequence which time correlates said input pattern feature vectors and the feature vectors of said each reference pattern feature vector sequence to one another so as to minimize a difference between a pattern represented by the specific vector components specified by the dimension specifying signal corresponding to said each reference pattern feature vector sequence and another pattern represented by the input pattern feature vector components corresponding to said specific vector components; and comparing means connected to said input pattern buffer means, said reference pattern memory means, and said time-normalizing means for comparing said input pattern feature vector sequence and said reference pattern feature vector sequences with one another with reference to the warping functions determined for the respective reference pattern feature vector sequences to decide which of said reference patterns is most similar to said input pattern.

2. A pattern recognition device as claimed in claim 1, wherein said comparing means comprises:

reading means connected to said input pattern buffer means, said reference pattern memory means, and said time-normalizing means for reading time correlated input pattern feature vectors and the feature vectors of said each reference pattern feature vector sequence;

nonlinear matching means connected to said reading means for carrying out nonlinear pattern matching between a pattern represented by the read-out input pattern feature vectors and another pattern represented by the read-out reference pattern feature vectors to derive for said each reference pattern feature vector sequence a similarity measure between said input pattern and the reference pattern represented by said each reference pattern feature vector sequence; and decision means connected to said nonlinear matching means for deciding to which of said reference patterns said input pattern corresponds in response to the maximum similarity measure.

3. A pattern recognition device as claimed in claim 1, wherein said comparing means comprises:

reading means connected to said input pattern buffer means, said reference pattern memory means, and said time-normalizing means for reading particular vector components of said input pattern feature vectors and particular vector components of the feature vectors of said each reference pattern feature vector sequence which are time correlated to one another by the warping function determined for said each reference pattern feature vector sequence, said particular reference pattern feature vector components being the components of a plurality of particular dimensions predetermined for each of said reference pattern feature vector sequences, said particular dimensions including the at least one specific dimension specified by said dimension specifying signal, the dimensions of said particular input pattern feature vector components corresponding to the dimensions of said particular reference pattern feature vector components;

nonlinear matching means connected to said reading means for carrying out nonlinear pattern matching between a pattern represented by the read-out particular input pattern feature vector components and another pattern represented by the read-out particular reference pattern feature vector components to derive for said each reference pattern feature vector sequence a similarity measure between said patterns; and decision means connected to said nonlinear matching means for deciding which of said reference patterns said input pattern corresponds in response to the maximum similarity measure.

4. A pattern recognition device as claimed in claims 1, 2, or 3, further comprising:

input means connected to said reference pattern memory means for successively supplying said reference pattern feature vector sequences to said memory means to be memorized therein;

dimension specifying means connected to said input means for successively specifying the specific dimensions for the respective reference pattern feature vector sequences, said dimension specifying signals produced by comparing variations in time of patterns represented by the vector components of the respective dimensions for each of said reference pattern feature vector sequences with one another and by selecting the dimension corresponding to the reference pattern feature vector sequence for which the variation is a maximum; and means between said dimension specifying means and said reference pattern memory means for successively supplying the produced dimension specifying signals to said reference pattern memory means to allow said reference pattern memory means to memorize the produced dimension specifying signals.

* * * * *

UNITED STATES PATENT AND TRADEMARK OFFICE
CERTIFICATE OF CORRECTION

PATENT NO. : 4,282,403
DATED : August 4, 1981
INVENTOR(S) : Hiroaki Sakoe

It is certified that error appears in the above—identified patent and that said Letters Patent is hereby corrected as shown below:

Column 1, line 18, change "electric" to --electronic--.

Column 4, line 25, change "analysing" to --analyzing--.

Column 7, line 15, insert a colon (:) after "to".

Column 9, line 14, insert a period (.) after "(5)".

Column 9, line 50, change "duces" to --duce--.

Column 9, line 56, change "(I, $j^n$)" to --(I, $J^n$)--.

Column 11, line 36, change "$b^n$ hd j,1" to --$b^n j,1$--.

Column 11, line 55, change "analysing" to --analyzing--.

Column 11, lines 60-61, change "analyser" to --analyzer--.

Column 11, line 67, change "depected" to --depicted--.

Signed and Sealed this

Second Day of March 1982

[SEAL]

Attest:

GERALD J. MOSSINGHOFF

Attesting Officer    Commissioner of Patents and Trademarks